(12) United States Patent
Perkal et al.

(10) Patent No.: US 11,011,186 B2
(45) Date of Patent: May 18, 2021

(54) MOBILE EMULATOR DETERMINATION USING SOUND DETECTION

(71) Applicant: PayPal, Inc., San Jose, CA (US)

(72) Inventors: Yotam Perkal, Beer-Sheva (IL); Yuri Shafet, Beer-Sheva (IL)

(73) Assignee: PayPal, Inc., San Jose, CA (US)

( * ) Notice: Subject to any disclaimer, the term of this patent is extended or adjusted under 35 U.S.C. 154(b) by 9 days.

(21) Appl. No.: 16/458,166

(22) Filed: Jun. 30, 2019

(65) Prior Publication Data

US 2020/0411035 A1     Dec. 31, 2020

(51) Int. Cl.

| | |
|---|---|
| *G10L 25/51* | (2013.01) |
| *G06F 21/44* | (2013.01) |
| *G06Q 20/10* | (2012.01) |
| *H04R 3/04* | (2006.01) |
| *G10L 25/72* | (2013.01) |
| *H04R 29/00* | (2006.01) |
| *G10L 21/0232* | (2013.01) |
| *G06Q 20/32* | (2012.01) |

(52) U.S. Cl.
CPC .............. *G10L 25/51* (2013.01); *G06F 21/44* (2013.01); *G06Q 20/10* (2013.01); *G06Q 20/322* (2013.01); *G10L 21/0232* (2013.01); *G10L 25/72* (2013.01); *H04R 3/04* (2013.01); *H04R 29/001* (2013.01)

(58) Field of Classification Search
CPC ..... G10L 25/51; G10L 21/0232; G10L 25/72; H04R 3/04; H04R 29/001; G06F 21/44; G06Q 20/10; G06Q 20/322

USPC .................................................. 381/56, 58
See application file for complete search history.

(56) References Cited

U.S. PATENT DOCUMENTS

| | | | |
|---|---|---|---|
| 8,126,446 B2 | 2/2012 | Hassan et al. | |
| 9,118,293 B1 | 8/2015 | Zelenov et al. | |
| 9,357,366 B2 | 5/2016 | Seolas et al. | |
| 2006/0291671 A1* | 12/2006 | Hyatt | H04M 1/6008 |
| | | | 381/110 |
| 2018/0241577 A1* | 8/2018 | D'Souza | H04W 12/00508 |

FOREIGN PATENT DOCUMENTS

CN        104144058 B   * 10/2017

* cited by examiner

*Primary Examiner* — William A Jerez Lora
(74) *Attorney, Agent, or Firm* — Kowert, Hood, Munyon, Rankin & Goetzel, P.C.; Erik A. Heter

(57) ABSTRACT

A method and apparatus for mobile emulator determination using sound fingerprinting is disclosed. The method includes a verification computer system receiving a transaction request from a computing device purporting to be a mobile device. Responsive to receiving the request, the verification computer system transmits a request for verification information to the computing device. The verification system includes information regarding a tone to be generated by a speaker of the computing device. Thereafter, verification information is received from the computing device. The verification information includes information tone information generated by the computing device, wherein the tone is, after generation, detected by a microphone. The verification system then verifies, based on the receive verification information, whether the information indicates that the computing device is a mobile device.

20 Claims, 9 Drawing Sheets

MOBILE EMULATOR DETERMINATION USING SOUND DETECTION

BACKGROUND

Technical Field

This disclosure is directed to security mechanisms in transaction processing systems, and more particularly, to verification mechanisms to determine whether a transaction request originates from a mobile device.

Description of the Related Art

Transaction processing services are ubiquitous today and provide a wide variety of services to users, including facilitating electronic payment for goods and services. Account holders of a transaction processing service pay for goods electronically, and may also donate to causes, transfer money to family and friends, and perform other interactions through the transaction processing service. Transactions may be initiated from a variety of devices, including desktop computers and mobile devices. Many mobile devices may execute apps that are specific to a particular payment service (e.g., a service such as that provided by PAYPAL). This in turn adds another layer of convenience for users of transaction processing services.

Any payment processing service deals with fraudulent transactions. Fraudulent transactions may take many forms, including transaction request that purport to originate from mobile apps, but in reality originate from a computer system (e.g., desktop or laptop computer) running a mobile device emulator—that is, software that is designed to mimic properties of a mobile device. A malicious actor operating such a computer system may use an emulator to generate a large number of fraudulent transaction requests to a payment processing service.

SUMMARY

A method and apparatus for mobile emulator determination using sound detection is disclosed. In one embodiment, a method includes a verification computer system receiving a transaction request from a computing device purporting to be a mobile device. Responsive to receiving the request, the verification computer system transmits a request for verification information to the computing device. The verification system includes information regarding a tone to be generated by a speaker of the computing device. Thereafter, verification information is received from the computing device. The verification information includes information tone information generated by the computing device, wherein the tone is, after generation, detected by a microphone of the computing device. The verification system then verifies, based on the received verification information, whether the information indicates that the computing device is a mobile device.

In one embodiment, a time lag between the tone as generated (by the speaker) and as detected (by the microphone) is measured (e.g., by using a phase difference). Based on the time lag, a distance between the microphone and speaker is determined. The determined distance can be checked against an expected distance, or within a range of expected distances, to determine whether the computing device is actually the purported mobile device as opposed to a different type of computing device that is attempting to emulate a mobile device. In some embodiments, when transaction request indicates a specific mobile device, the determined distance is compared against the expected distance to determine whether it is in fact that specific mobile device. If the determined distance does not match the expected distance, the verification computer system determines that the computing device is not the purported mobile device, and may reject the transaction.

In various embodiments, the frequency of the tone is a high sonic (e.g., above 15 kHz) or ultrasonic frequency (above 20 kHz). At high/ultrasonic frequencies, a user of the computing system from which the request originated (which may be operated by a malicious actor) may thus be unaware of the transmission of the tone. In various embodiments, the particular frequency of the tone that is to be generated by the requesting computer system may be determined by the verification computer system and sent to the requesting computer system. In one embodiment, the verification computer system may randomly determine the frequency of the tone as opposed to using a same predetermined tone.

BRIEF DESCRIPTION OF THE DRAWINGS

The following detailed description makes reference to the accompanying drawings, which are now briefly described.

Figure 1:
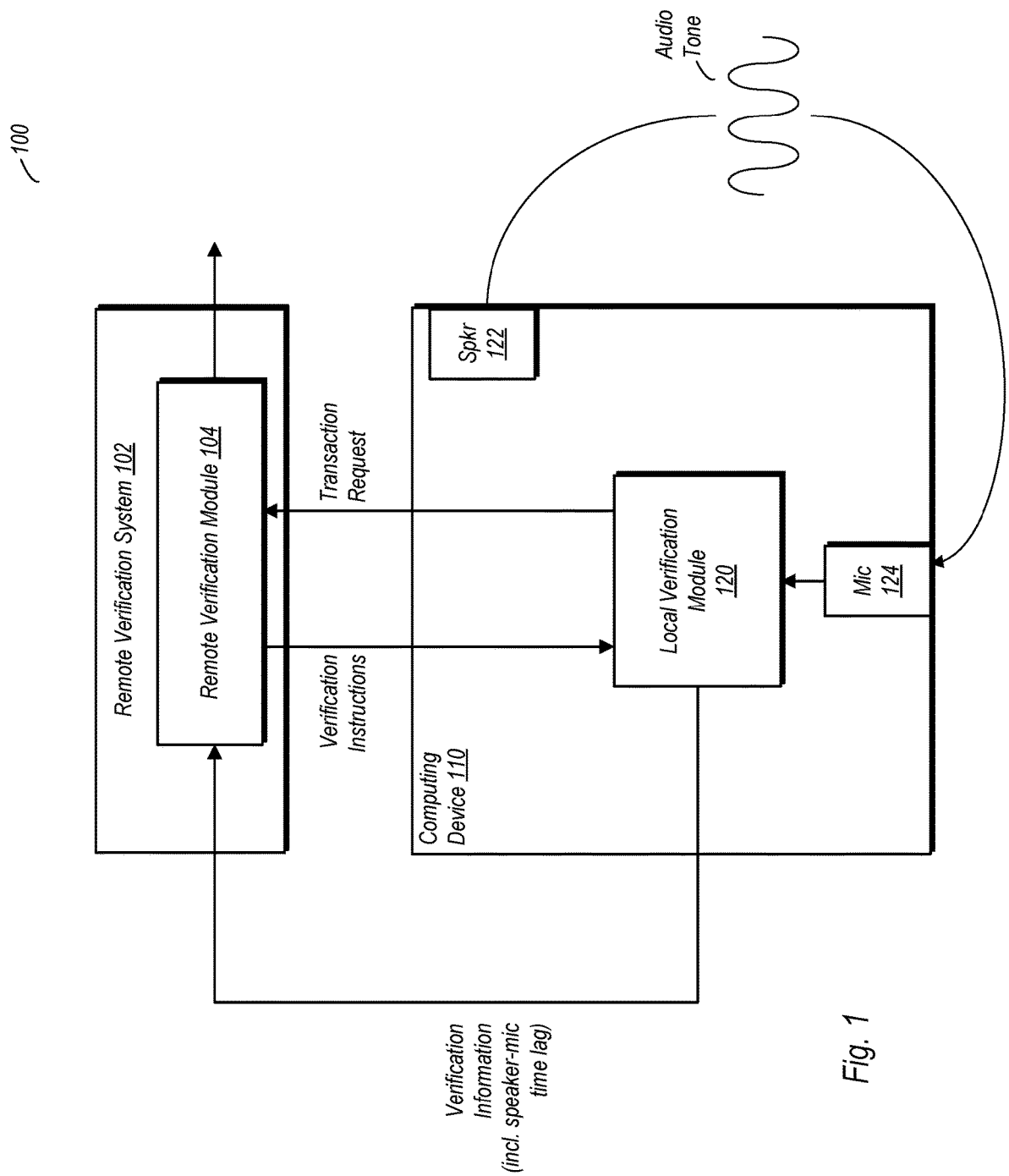
FIG. 1 is a block diagram illustrating one embodiment of a system having a computing device and a remote verification system.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Reciting in the appended claims that an element is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors.

As used herein, the terms "first," "second," etc. are used as labels for nouns that they precede, and do not imply any type of ordering (e.g., spatial, temporal, logical, etc.), unless stated otherwise.

In the following description, numerous specific details are set forth to provide a thorough understanding of the disclosed embodiments. One having ordinary skill in the art, however, should recognize that aspects of disclosed embodiments might be practiced without these specific details. In some instances, well-known, structures, computer program instructions, and techniques have not been shown in detail to avoid obscuring the disclosed embodiments.

DETAILED DESCRIPTION OF EMBODIMENTS

Various embodiments for mobile emulator determination using sound detection are disclosed. Mobile emulators are computer programs that are used to emulate, or mimic, properties of a mobile device, such as a smart phone. This emulation can include the running of a particular operating system of the device, as well as various applications that may also operate on the device. Generally speaking, a mobile emulator may allow a user to control and emulate various parameters of a mobile device, such as SIM (subscriber identity module) configuration, root access, hardware configuration, and so on. Given the capabilities of mobile device emulators, another computer system may not be able to differentiate between interactions with mobile devices and mobile device emulators.

Malicious actors, using improperly obtained credentials, may use mobile emulators to attempt fraudulent transactions through a transaction processing service. In some cases, a single computer system may be used to simultaneously run a large number of mobile device emulators, each of which is attempting fraudulent transactions. Detection of such transactions can be difficult due to the ability of a mobile emulator to emulate virtually any parameter of a mobile device. The present disclosure, however, contemplates a methodology for distinguishing between actual mobile devices and mobile emulators purporting to be mobile devices in order to combat fraudulent transactions attempted through the latter.

Consider a transaction request that is initiated by a first computer system (a "requestor," "requestor system" or "requesting computer system") and sent to a second computer system (a "remote verification system") for approval. In one embodiment, upon receiving a transaction request from a requestor system, a remote verification system may provide verification instructions to the requestor (specifically to an application running on the requestor). These instructions include information that may be used by the requestor to generate an audio tone. The information may include a frequency of the tone to be generated, and may include additional information such as information used to modulate the tone, waveform shape, etc. Upon receiving the information, the application running on the requestor cause a tone to be generated by its speaker. This tone, in turn, is detected by a microphone of the requestor. The application may then compare information about the tone generated by the speaker and the tone detected by the microphone.

For example, a phase lag between the tone as generated and the tone as detected, and this information may be used to make a determination as to the distance between the speaker and the microphone of the requestor. This distance is then checked against an expected distance for the mobile device. If the determined distance correlates with the expected distance, this suggests that this physical property of the requestor is consistent with a mobile device; accordingly, the transaction may be allowed to proceed. In some instances, this check may be combined with other techniques to determine whether the device is a mobile device or not. On the other hand, if the determined distance does not correlate to the expected speaker-microphone distance, the transaction may be terminated or indicated as suspect since it is likely that the requestor is not a mobile device, and thus may have originated from a mobile device emulator. Typically, the distance between a speaker and a microphone in a mobile device is significantly less than that of a desktop computer or laptop. Thus, the speaker-microphone distance is a physical parameter of the requestor that may not be susceptible of being reproducing by a non-mobile-device, and thus may be used in determining the authenticity of a requestor purporting to be a mobile device. For example, on mobile phones, the distance between a speaker and a microphone can be as small as a few centimeters (e.g., for example, less than three centimeters on certain smartphones). Tablet computers, another class of mobile device, may also have similarly small speaker-microphone distances.

In one embodiment, the frequency of the tone may be a high sonic (e.g., 15 kHz or above) or ultrasonic (20 kHz or above). A user will not likely hear the tone at a high sonic frequency, while tones in the ultrasonic range are beyond the capability of human hearing. Accordingly, the fact that the sound detection method disclosed herein is being performed may be not be known by a malicious user of the computing system.

The verification computer system, in various embodiments, specifies the frequency of the tone to be generated on the computing device. In one embodiment, the verification computer system randomly determines the frequency of the tone to be generated. The frequency of the tone is conveyed to the computing system as at least part of the verification information. In some embodiments, additional information, such as a code or other information, can be included and can be used to modulate the tone prior to it being generated by the speaker. After detection, the tone can be demodulated and the code/information can be recovered and used as another level of verification.

In some embodiments, background noise may be recorded concurrent with detecting the tone. The background noise may be correlated with reported location information as another verification check. For example, if the reported location is expected to be a noisy environment, or have a certain type of noise profile, a recording thereof can be used to verify that the computing device is at the reported location. If the recorded background noise does not correlate (or is altogether absent), the verification system can determine that the computing device is likely an emulator running on a computer system, and thus cause denial of the transaction request.

In various embodiments, different computer systems within entities may implement various "modules." As used herein, the term "module" refers to circuitry configured to perform specified operations, or to physical, non-transitory computer-readable media that stores information (e.g., program instructions) that instructs other circuitry (e.g., a processor) to perform specified operations. Such circuitry may be implemented in multiple ways, including as a hardwired circuit or as a memory having program instructions stored therein that are executable by one or more processors to perform the operations. The hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Turning now to FIG. 1, a block diagram of one embodiment of a system 100 is shown. In the illustrated embodiment, system 100 includes a remote verification system 102 coupled to a computing device 110. Remote verification system 102 performs certain verification functions with regard to transactions initiated by various types of computing devices. Among the functions performed, remote verification system 102 may verify whether computing device 110 is either a mobile device or another computer system running an emulator, which may be referred to herein as an emulating device. Accordingly, one of the verification functions performed by remote verification system 102 is to help determine whether computing device 110 is actually a mobile device or an emulating device.

In the embodiment illustrated, remote verification system 102 includes a remote verification module 104, details of which are discussed further below. Responsive to receiving a transaction request from computing device 110 (e.g., a payment request, a money transfer request, a file transfer request, etc.), remote verification module 104 provides verification instructions to computing device 110. The transaction request may include information indicating that computing device 110 is a mobile device. This information can include, e.g., the name of the browser or other software used, software version, rendering engine and rendering engine version, operating system (which can indicate that the requesting system is identifying itself as a mobile device), and so on. The verification instructions provided to computing device include information regarding a tone to be generated for the purposes of sound verification. After computing device 110 performs the sound verification, it may send verification information back to remote verification module 104. Module 104 in turn uses this information to verify whether computing device 110 is actually a mobile device. It is noted that in some cases, use of the microphone may require a user permission to use the same. Accordingly, in some embodiments, permission to access the microphone may be asked of a user prior to using the sound detection method discussed herein.

Computing device 110 includes a local verification module 120, a speaker 122, and a microphone 124. Transaction requests may be generated from local verification module 120 and conveyed to remote verification system 102. In some cases, local verification module 120 may be an application that a user of device 110 uses to initiate a payment transaction with a merchant. As part of approving the transaction, system 102 returns verification instructions to local verification module 120. These instructions include information regarding an audio tone to be generated by device 110. This information typically includes a frequency of the desired tone, and may also include other information that used to perform additional levels of verification. In some embodiments, the frequency of the tone may be randomly generated within a given range of frequencies (e.g., above 15 kHz). The other information may include, but is not limited to, amplitude of the tone, waveform of the tone (e.g., sine wave, sawtooth wave, etc.), duration of the tone, etc. In some embodiments, as will be discussed below, modulation information used to modulate the tone may be provided directly or otherwise indicated within the verification instructions. In some embodiments, the verification instructions may also include instructions to provide information other than that related to the tone (e.g., device serial number or other identifying information).

In accordance with the received verification instructions, local verification module 120 causes the tone to be generated. The generated tone from speaker 122 is then detected by microphone 124. Information regarding the detected tone is provided to local verification module 120. For example, local verification module may receive or generate waveform information representative of a waveform of the detected tone. Using this information, local verification module 120 may compare the generated tone to the detected tone and thus determine parameters such as a time lag between tone generation by the speaker and the tone detection by the microphone. This information can be used to determine a distance between the speaker and the microphone of device 110. In some embodiments, local verification module 120 may determine this distance, while in other embodiments, the distance is determined at remote verification system 102. This distance may be subsequently used to verify whether or not computing device 110 is a mobile device as purported to be in the transaction request.

This methodology may advantageously be used to combat the use of mobile device emulators to perform fraudulent transactions by including as part of the verification process a sound detection check that will typically produce different results when performed on an actual mobile device as opposed to an emulating device. In some instances, malicious actors may concurrently run multiple sessions of emulator software on a computer system. Accordingly, it is possible that the computer system could detect multiple tones at substantially the same time. When this occurs, remote verification system 102 may determine the presence of multiple tones and use this information to determine that the requesting device is a mobile emulator.

Figure 2:
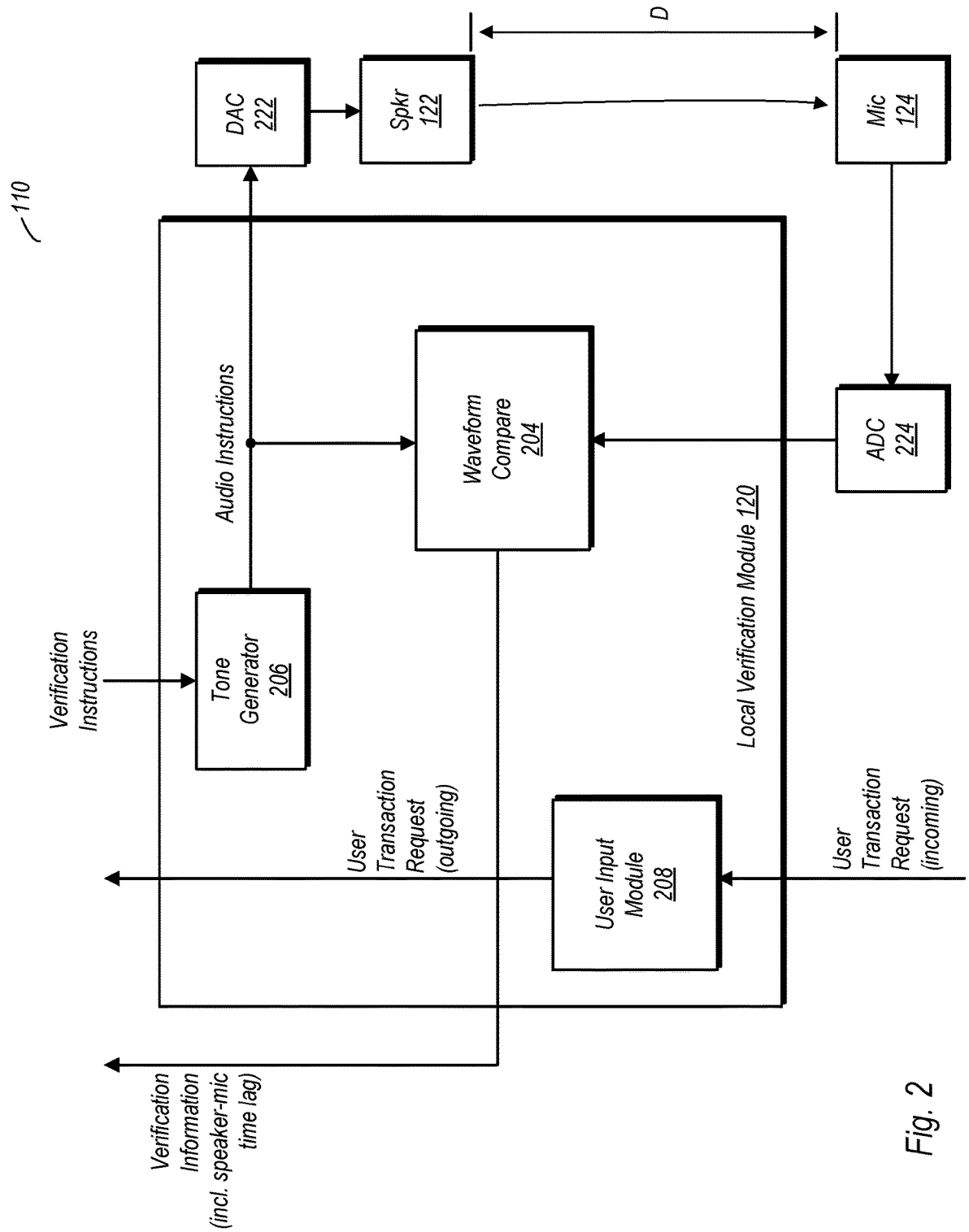
FIG. 2 is a block diagram illustrating one embodiment of a local verification module implemented in a computing device.

FIG. 2 is a block diagram illustrating one embodiment of local verification module 120 that may be implemented in a computing device 110 that has initiated a transaction. In the embodiment shown, local verification module 120 includes a waveform compare module 204, a tone generator 206, and a user input module 208. FIG. 2 also illustrates additional components of computing device 110, including digital-to-analog computer (DAC) 222, speaker 122, microphone 124, and analog-to-digital converter (ADC) 224. Speaker 122 and microphone 124 are separated by a distance D as shown in FIG. 2, and this distance can be used to verify the identity of computing device 110.

User input module 208 in the embodiment shown receives user transaction requests, such as a request to pay a particular merchant. Information may be received by user input module 208 from, e.g., a user input mechanism of a computing device (such as a touch screen, keyboard) in which local verification module 120 is implemented. User input module 208 may format the transaction request in a manner that is expected by remote verification system 102. For instance, module 208 may include information indicating that computing device 110 is a mobile device. Other hardware information such as identifying information of the mobile device such as a serial number may also be included. This information is then conveyed to remote verification system 102.

Tone generator 206 in the embodiment shown receives verification instructions that include information regarding an audio tone to be generated. This information can include a frequency of the tone, amplitude of the tone, waveform shape of the tone and any other relevant information used to generate the tone. Based on this information, tone generator 206 generates audio instructions that correspond to the desired tone. The audio instructions are conveyed to both a digital-to-analog converter (DAC) 222 as well as to waveform compare module 204. DAC 222 generates an analog electrical representation of the tone based on the audio instructions. The analog electrical representation is provided to speaker 122, where the actual audio tone is generated and transmitted. Microphone 124 in the embodiment shown receives and detects the tone generated and transmitted by speaker 122. Responsive to detecting the tone, microphone 124 generates corresponding analog electrical signals that are forwarded to analog-to-digital converter (ADC) 224. ADC 224 converts the analog electrical signals into a digital format that is then forwarded to waveform compare module 204.

Upon receiving the digital information corresponding to the detected tone, waveform compare module 204 may perform various comparison operations. One comparison operation performed by waveform compare module 204 is to determine a lag between the time the tone was generated and the time the tone was detected. This may be determined by, e.g., determining a phase difference between the generated and detected tones. Based on the time lag, the distance between the speaker and the microphone can be determined. The distance determination can also be performed in waveform compare module 204 in some embodiments, although in other embodiments, this determination is made in remote verification system 102. The distance between the microphone and speaker on a mobile device may differ significantly from the speaker-microphone distance of an emulating device. Accordingly, the distance may be used in verifying whether or not computing device 110 is a mobile device, particularly since a mobile device emulator cannot change the physical distance between the speaker and the microphone on the computer system on which it is running.

In some embodiments, waveform compare module 204 may make allowance for a Doppler shift in the frequency since it is possible that a mobile device may undergo some motion during the verification process. Other information subject to comparison by waveform compare module may include waveform shape, amplitude (generated vs. detected), and so on. As will be discussed below, some embodiments the audio tone may be modulated with additional verification information. In such embodiments, waveform compare module 204 may perform a demodulation operation to extract the information that was used to modulate the generated audio tone.

Figure 3:
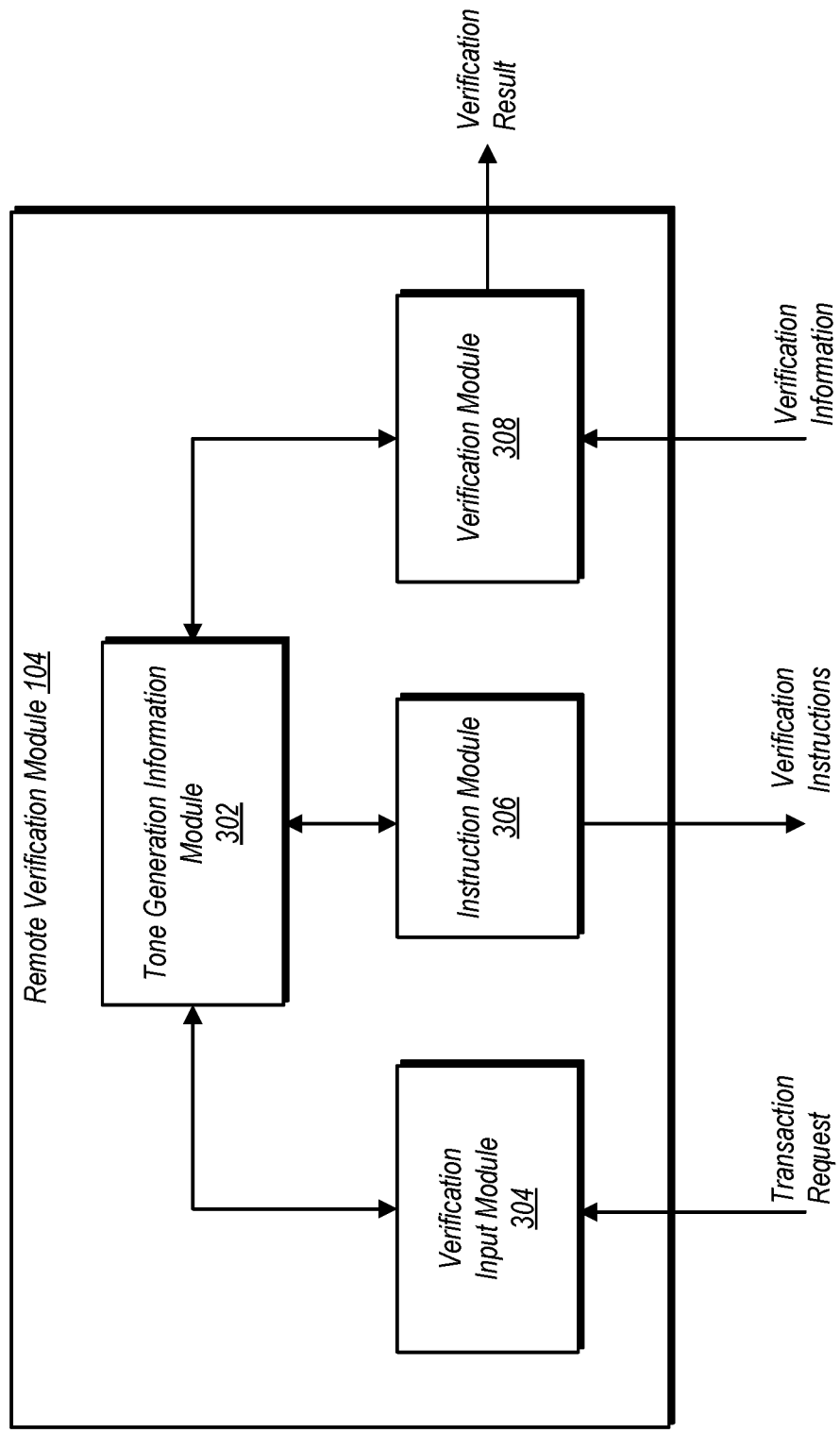
FIG. 3 is a block diagram illustrating one embodiment of a remote verification module implemented in a remote verification system.

FIG. 3 is a block diagram illustrating one embodiment of remote verification module 104 as implemented in a remote verification system. In the embodiment shown, remote verification module 104 includes a tone generation information module 302, a verification input module 304, an instruction module 306, and a verification module 308. Remote verification module 104 as shown here may be implemented in various embodiments of remote verification system 102 as discussed above.

Verification input module 304 receives a transaction request conveyed from a computing device. Upon receiving the transaction request, verification input module determines from information contained in the request whether the requesting computing system identifies itself as a mobile device. If the device is identified as a mobile device, a call is made to tone generation information module 302. A device may identify itself as a mobile device using information discussed above (e.g., browser, operating system, version information, etc.). Furthermore, in some cases, a requesting user will use a mobile application of a transaction service (e.g., a PAYPAL mobile application when attempting a transaction through PAYPAL), which may be included in the identifying information sent with the request.

Upon receiving an indication of a transaction request from a computing system identifying as a mobile device, tone generation information module 302 generates information for an audio tone to be used in determining the identity of the requesting device. In some embodiments, tone generation information module 302 may select a frequency of the tone by random generation. The tone may in some cases be limited in frequency to those that are in the high sonic range (defined here as 15 kHz or above) or ultrasonic range (20 kHz or above). Tone generation information module 302 may also generate other information regarding the tone, including waveform amplitude and waveform shape.

Information regarding the tone is forwarded from tone generation information module 302 to instruction module 306. Instruction module 306 may provide additional information that is to be conveyed with the tone generation information. In some embodiments, this may include information that is used to modulate the tone, or instructions to access information to modulate the tone. Verification instructions provided by instruction module 306 may also include additional instructions for the requestor to provide certain information, such as location information, additional information regarding the device, or other information usable for identification. The verification instructions are then transmitted to the requestor.

Verification module 308 receives information regarding the audio tone from tone generation information module 302. Additionally, verification module 308 also receives verification information from the computing device 110 after the tone has been generated and detected at that device. Using the verification information, verification module 308 may determine whether the detected tone conforms to the instructions issued by instruction module 306. Additionally, verification module 308 may also use the verification information received from computing device 110 to verify whether it is a mobile device as initially indicated in the transaction request. This may include comparing an expected speaker-microphone distance value to the actual speaker-microphone distance that is determined using the method discussed herein. In one embodiment, verification module 308 may include or may access a database of information regarding mobile devices from which transactions can be requested. Different types of mobile devices may have slightly different speaker-microphone distances. Verification module 308 may determine speaker-microphone distance based on a time lag reported in the verification information by comparing that distance to an expected distance for the particular mobile device. If the measured distance is equal to (or within a specified margin of error), verification module 308 may determine that the requestor is actually a mobile device. Conversely, if these distances do not match and are outside a specified margin of error, verification module 308 determines that the requesting device is not a mobile device.

Verification module 308 may also determine that a computing device is not a mobile device in other situations. For example, if the initial transaction request originated from a computer system having no microphone, no speakers, or neither, no tone information is returned to verification module 308. Based on the lack of tone information, verification module may summarily determine that the transaction did not originate from a mobile device.

Upon completing the verification procedures discussed above, verification module 308 issues a verification result. This result may be forwarded to other systems/modules in which other verification steps are performed for the requested transaction. When the verification result indicates that the requesting device is not a mobile device despite indicating otherwise, such systems may deny the transaction based on the false identity. Alternately, the verification result may be used as one factor of many in determining whether to approve a transaction.

Figure 4:
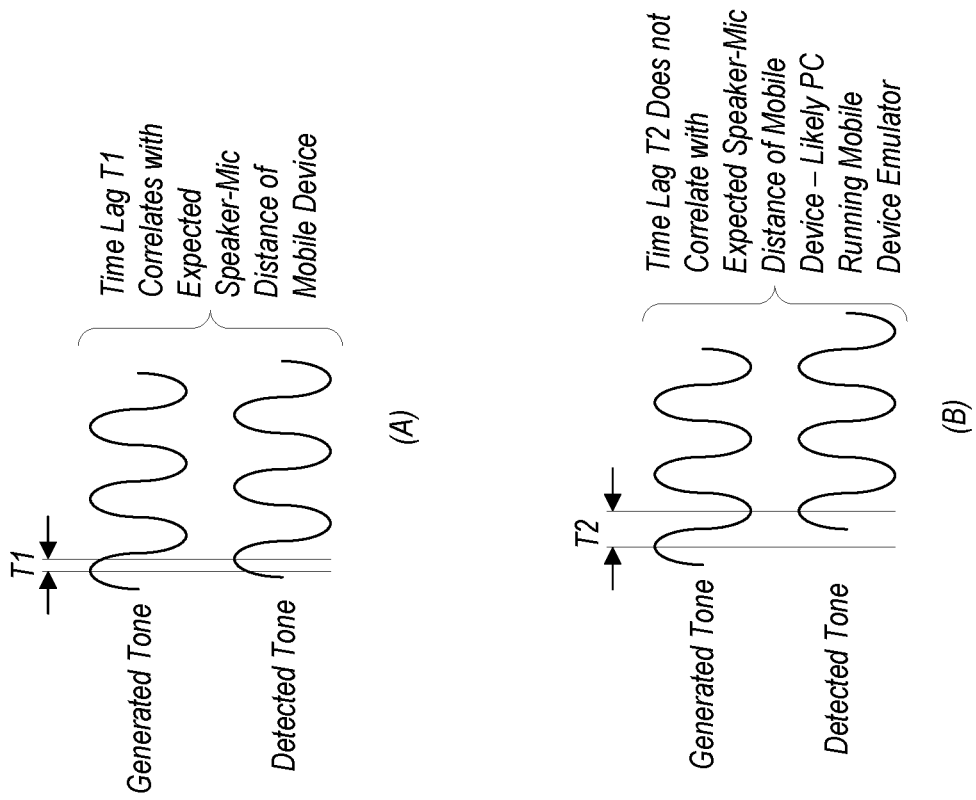
FIG. 4 is a diagram illustrating a mechanism for determining whether a computing device is a mobile device or computer running a mobile device emulator according to one embodiment of a verification module.

FIG. 4 is a diagram illustrating a mechanism for determining whether a computing device is a mobile device or an emulating device (e.g., a computer system running a mobile device emulator) according to one embodiment of a verification module. In both (A) and (B), a measurement between peaks of a sine wave (representative of one possible audio tone) is shown. In (A), this measurement results in a time lag measurement of T1, meaning a peak of the detected tone is detected at a time T1 after the equivalent peak of the generated tone. This measured time correlates to a speaker-microphone distance that is expected for a particular mobile device or mobile devices in general. Accordingly, if local verification module 120 reports a time lag of T1 to remote verification module 104, the latter determines that the device making the request corresponds to its reported identity as a mobile device.

In (B), the measured lag between equivalent peaks of the generated tone and the detected tone results in a value of T2. This measured time does not correlate with an expected distance between the speaker and microphone of the mobile device that was reported as the initiating device in the transaction request. Furthermore, the lag of T2 may not correlate to any known mobile device in some cases. Accordingly, when local verification module 120 reports a time lag of T2 to remote verification module 104, the latter determines that requesting device is not the mobile device as initially identified. In this case, the transaction is either denied or this factor is recorded as indicating the transaction is suspicious.

Figure 5:
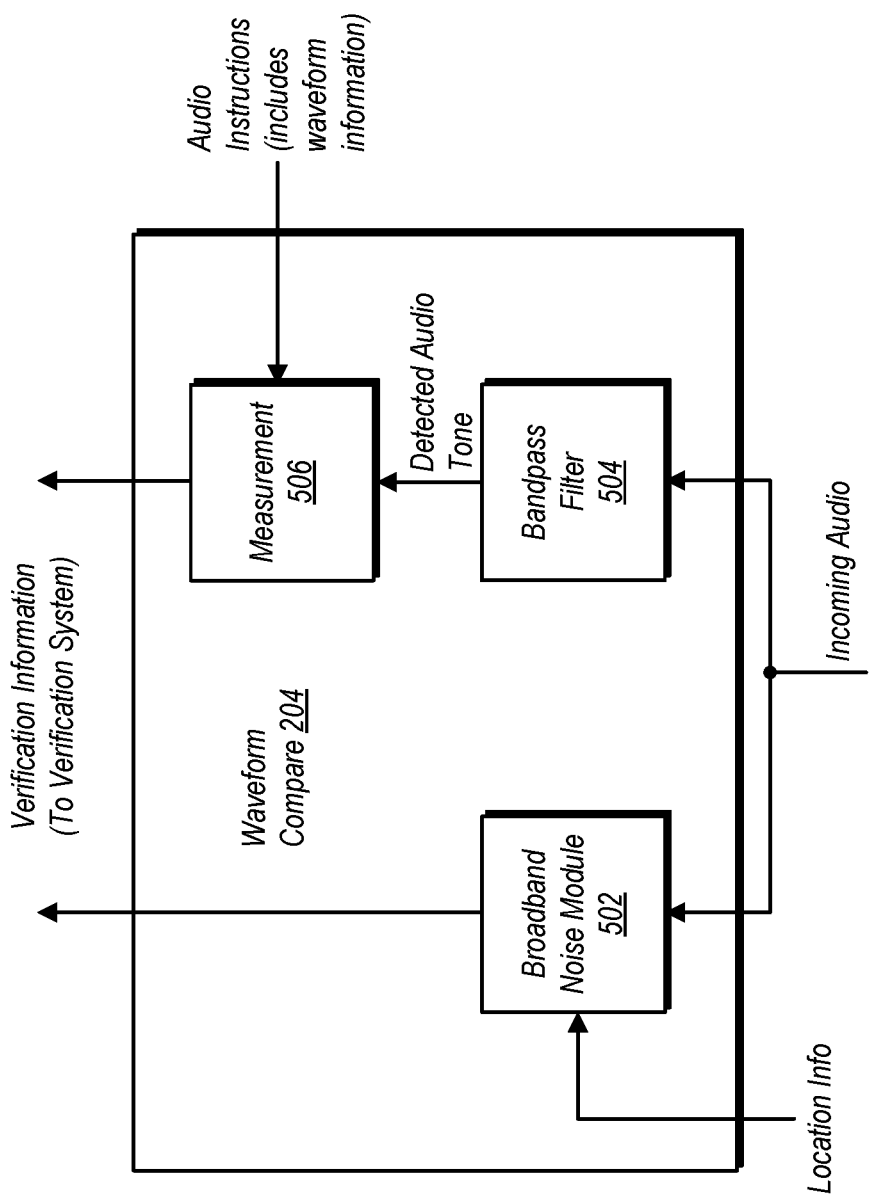
FIG. 5 is a block diagram illustrating one embodiment of a waveform compare module.

FIG. 5 is a block diagram illustrating one embodiment of a waveform compare module. In the embodiment shown, waveform compare module 204 includes a broadband noise module 502, a bandpass filter 504, and a measurement module 506. The information generated by broadband noise module 502 and measurement 506 is output to a verification system, such as that shown above in reference to FIG. 1.

Waveform compare module 204 receives incoming audio information, which may be in a digital format after conversion from analog. The digital data stream comprising the audio information may be split into two separate paths. The incoming audio information is provided in a first path to broadband noise module 502, and in a second path to bandpass filter 504. In the first path, the unfiltered noise detected by the microphone during transmission and reception of the audio is recorded as background noise. In addition to receiving the unfiltered audio information, broadband noise module 502 also receives location information indicative of a present location of the mobile device in which waveform compare module 204 is implemented.

Broadband noise module 502 conveys both the location information and the recorded background noise to a verification system. The verification system may, in some embodiments, correlate the recorded background noise with the reported location information. Correlating background noise with reported location information may be used to gain an additional measure of confidence with regard to the determination whether the requesting device is actually a mobile device. For example, if the reported location is a noisy environment, but little or no background noise is recorded, a verification system may indicate the existence of a discrepancy between the two. When combined with discrepancy of the measured speaker-microphone distance of computing device initiating the request, the verification system may conclude that the device is not a mobile device despite identifying itself to the contrary. In some embodiment, broadband noise module 502 may implement one or more machine learning models that is trained to analyze ambient/background noise. For example, the machine learning model may use a classifier that relies on both temporal parameters (e.g., signal energy, zero-crossing, pitch, and so on) and spectral parameters (e.g., spectral rolloff point, spectral centroid, mean frequency, and so on). Using machine learning models to analyze such parameters of received input noise and comparing that to expected ranges of values can thus provide yet another indication as to whether the requesting device is actually a mobile device or a mobile emulator.

In the other path, the digital data stream is provided to bandpass filter 504. In this portion of waveform compare module 204, a digital filter is implemented to remove noise outside of a specified frequency band. The frequency band includes frequencies at which the audio tone may be transmitted, and thus a detected audio tone is allowed to pass. Bandpass filter 504 as shown here may implement any suitable type of filter, such as a finite impulse response (FIR) filter or an infinite impulse response (IIR) filter.

The filtered audio information, including the detected audio tone, is forwarded to measurement module 506. Among other functions, measurement module 506 may perform the measurement of the time lag between the generated and detected audio tones as discussed above in reference to FIG. 5. In some instances, this measurement may take into account small frequency shifts in the audio tone that may occur due to the Doppler effect. For example, if a mobile device is not perfectly stationary when the audio tone is transmitted, the distance traveled by the tone between the speaker (at the time of generation) and microphone (at the time of detection) may vary relative to the fixed distance between these two entities on the device itself. While this variation in distance is likely to be small, it may be non-negligible and can thus affect frequency of the detected tone. Accordingly, when performing the time lag measurement discussed herein, measurement module 506 may compensate for any small, but non-negligible shifts in frequency due to motion of a mobile device.

Measurement module 506 in various embodiments may also perform other functions. For example if the audio tone is modulated with additional information prior to generation at the speaker, measurement module 506 may perform demodulation to recover the additional information. Thereafter, the information may be conveyed, along with the obtained measurement data, to the verification system.

Figure 6:
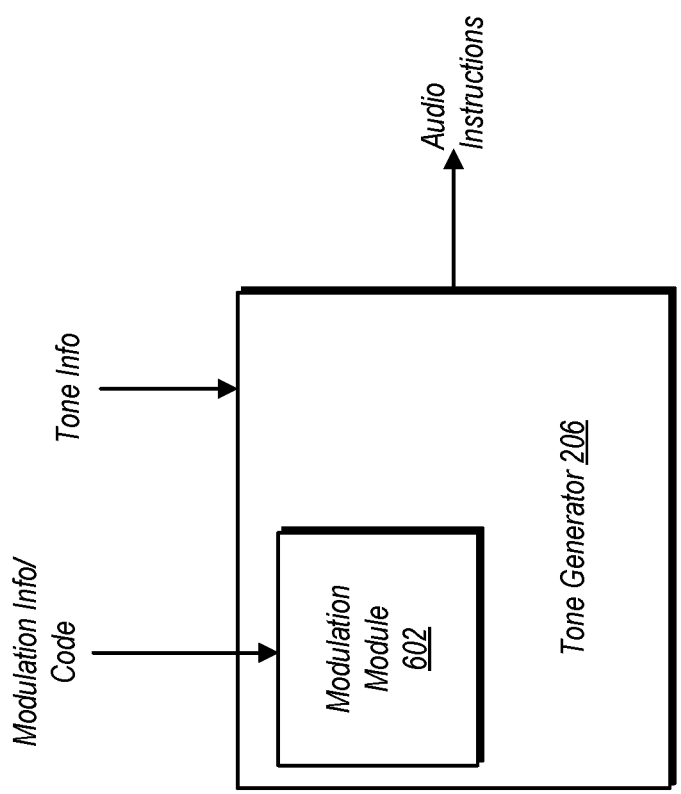
FIG. 6 is a block diagram of one embodiment of a tone generation module.

FIG. 6 is a block diagram of one embodiment of a tone generation module. In the embodiment shown, tone generator 206 is coupled to receive tone information specifying various parameters of the audio tone that is to be generated. This information includes a frequency of the tone, a duration the tone is to be transmitted, amplitude of the tone, waveform shape, and so on.

In the embodiment shown, tone generator 206 also includes a modulation module 602. In some instances, modulation information or a code used to modulate the audio signal may be provided along with the other verification instructions. The modulation information may be generated based on, e.g., certain hardware features of the alleged mobile device that have the potential to be different when a user is using an emulator running on a computer system. Thus, in addition to generating audio instructions for the basic parameters of the tone (frequency, amplitude, etc.), tone generator 206, via modulation module 602, may modulate the audio tone and thereby update the audio instructions before they are sent for conversion to analog signals and generation by the speaker. As noted above in the discussion of FIG. 5, this information may be recovered by demodulation in measurement module 506.

Figure 7:
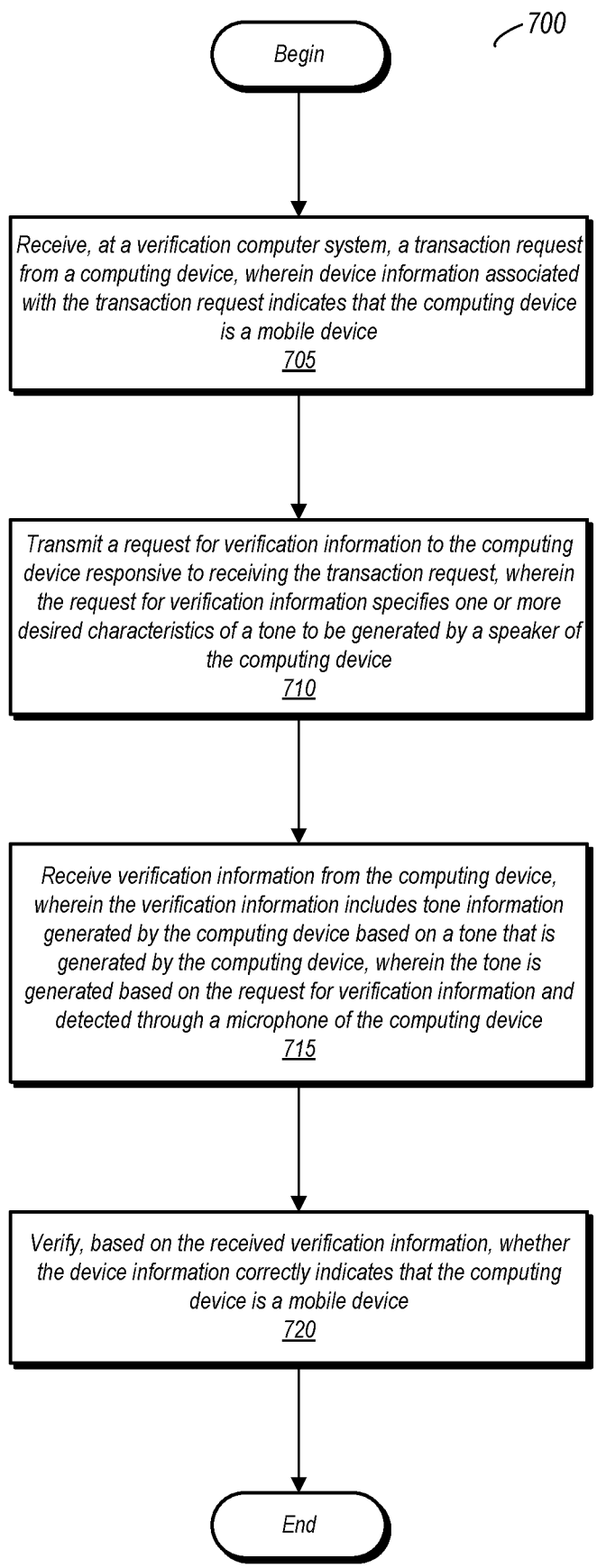
FIG. 7 is a flow diagram illustrating one embodiment of a method for verifying whether a device is a mobile device by a remote verification system.

FIG. 7 is a flow diagram illustrating one embodiment of a method for verifying whether a computing device is an emulating device or a mobile device, by a remote verification server. Method 700 as illustrated herein may be performed on various embodiments of a remote verification system, such as that discussed above with reference to FIG. 1.

Method 700 begins with receiving, at a verification computer system, a transaction request from a computing device, wherein device information associated with the transaction request indicates that the computing device is a mobile device (block 705). The method further includes transmitting a request for verification information to the computing device responsive to receiving the transaction request, wherein the request for verification information specifies one or more desired characteristics of a tone to be generated by a speaker of the computing device (block 710). Responsive to the request for verification information, method 700 includes receiving verification information from the computing device, wherein the verification information includes tone information generated by the computing device based on a tone that is generated by the computing device, wherein the tone is generated based on the request for verification information and detected through a microphone of the computing device (block 715). Method 700 concludes by verifying, based on the received verification information, whether the device information correctly indicates that the computing device is a mobile device (block 720).

In some embodiments, the one or more desired characteristics include a specified frequency of the tone, wherein the verifying includes determining a lag between the tone as detected and the tone as generated. In some embodiments, the specified frequency of the tone is an ultrasonic frequency. The verifying also includes determining, based on an expected distance between the speaker and the microphone of the mobile device, whether a phase difference between the tone as generated and the tone as detected corresponds to the expected distance. Accordingly, verifying further includes accessing, at the verification computer system, an expected distance between the speaker and the microphone of the computing device. The transaction request is, in various embodiments, a payment request issued from a payment application executing on the computing device.

Embodiments of the method 700 are possible and contemplated wherein the specified frequency of the tone is randomly determined by the verification computer system, and wherein transmitting the request for verification information to the computing device includes indicating the randomly determined frequency that is to be generated. Embodiments are also possible and contemplated wherein the verification information includes background noise information recorded by the computing device and further includes a reported location of the computing device at a time of the transaction request, and wherein verifying the computing device includes correlating the background noise information to the reported location of the computing device.

In some embodiments, the audio tone may be modulated. Accordingly, method 700 in such embodiments, the one or more desired characteristics include a modulation value to be used by the computing device to modulate a carrier signal in order to generate the tone, wherein the modulation value corresponds to a first set of information. The tone information includes a second set of information that is generated from demodulating the tone as detected, and thus the verifying includes comparing the first set of information to the second set of information to determine whether to approve the transaction request.

Figure 8:
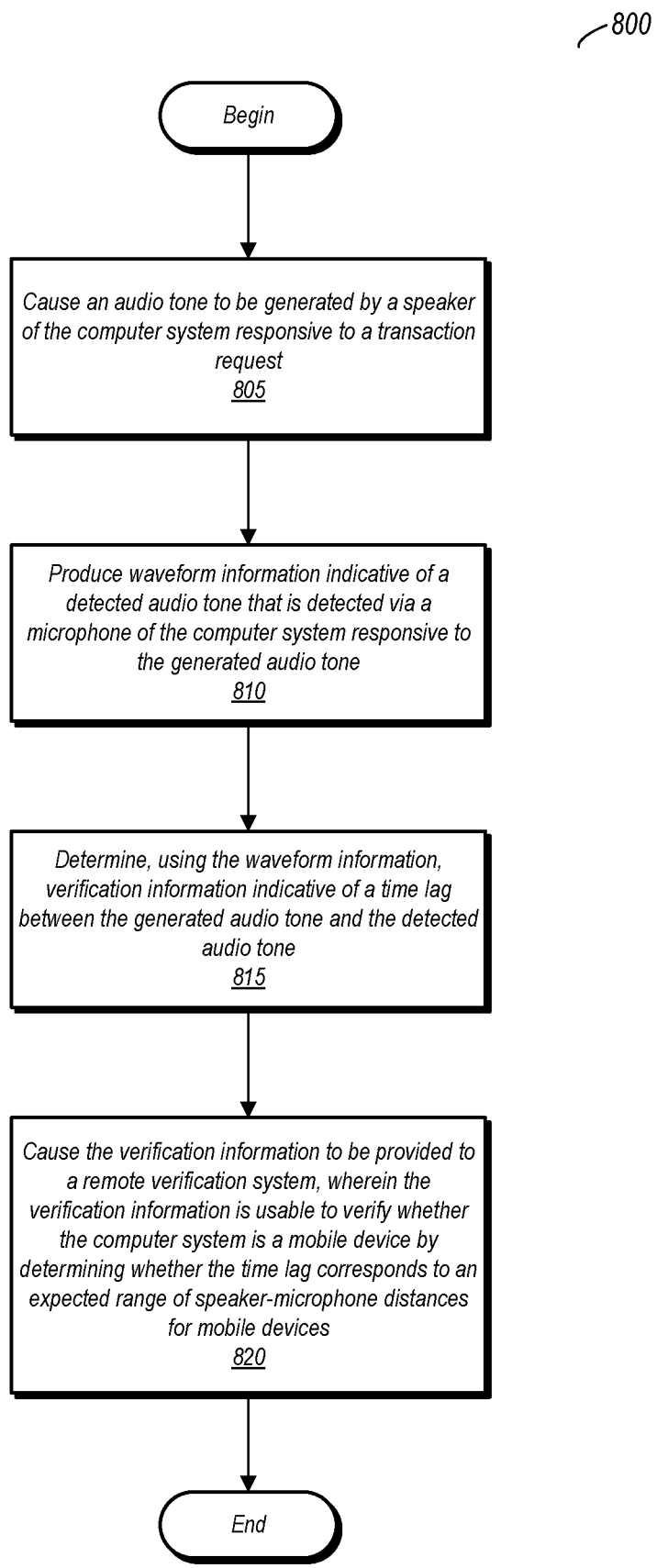
FIG. 8 is a flow diagram illustrating one embodiment of performing a verification method from the perspective of a computing device.

FIG. 8 is a flow diagram illustrating one embodiment of performing a verification method from the perspective of a computing device. Method 800 may be carried out by various embodiments of a computing device, such as computing device 110 as shown in FIG. 1. Furthermore, method 800 may be carried out by executing program instructions stored on a non-transitory computer readable medium.

Method 800 begins with causing an audio tone to be generated by a speaker of the computer system responsive to a transaction request (block 805). Method 800 further includes producing waveform information indicative of a detected audio tone that is detected via a microphone of the computer system responsive to the generated audio tone (block 810). After detecting the audio tone, method 800 continues with determining, using the waveform information, verification information indicative of a time lag between the generated audio tone and the detected audio tone (block 815). After determining the time lag, method 800 continues with causing the verification information to be provided to a remote verification system, wherein the verification information is usable to verify whether the computer system is a mobile device by determining whether the time lag corresponds to an expected range of speaker-microphone distances for mobile devices (block 820).

In various embodiments, causing the audio tone to be generated comprises generating the audio tone at a specified frequency, wherein the specified frequency is greater than or equal to 15 KHz. Embodiments are also possible and contemplated wherein causing the audio tone to be generated comprises generating the audio tone at a frequency according to a random number generated by the remote verification system. After detection, producing the waveform information includes filtering background noise from the detected audio tone. The time lag is determined based on a phase difference between the generated audio tone and the waveform information indicative of the detected audio tone.

The various operation of method 800 may further includes receiving a user request for a payment and sending the transaction request to the remote verification system responsive to the user request. Thereafter, method 800 includes receiving a verification request from the remote verification system responsive to the transaction request wherein causing the audio tone to be generated is performed responsive to receiving the verification request, and wherein the verification information.

Figure 9:
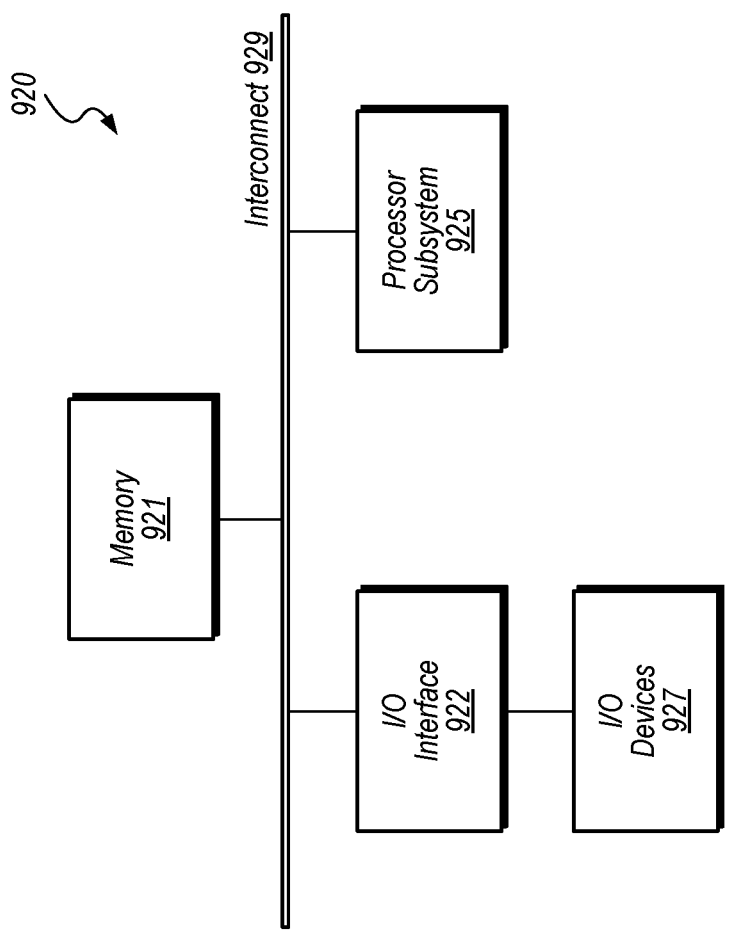
FIG. 9 is a block diagram of one embodiment of an example computer device.

FIG. 9 is a block diagram of one embodiment of an example computer system. Instances of computer system 920 as shown here may be implemented, in various embodiments, as a remote verification system, such as remote verification system 102 as shown in FIG. 1, or in various embodiments of a computing device 110 as discussed above.

Computer system 920 includes a processor subsystem 925 that is coupled to a system memory 921 and I/O interfaces(s) 922 via an interconnect 929 (e.g., a system bus). I/O interface(s) 922 is coupled to one or more I/O devices 927. Computer system 920 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 920 is shown in FIG. 9 for convenience, system 920 may also be implemented as two or more computer systems operating together.

Processor subsystem 925 may include one or more processors or processing units. In various embodiments of computer system 920, multiple instances of processor subsystem 925 may be coupled to interconnect 929. In various embodiments, processor subsystem 925 (or each processor unit within 925) may contain a cache or other form of on-board memory.

System memory 921 is usable store program instructions executable by processor subsystem 925 to cause system 920 perform various operations described herein. System memory 921 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 920 is not limited to primary storage such as memory 921. Rather, computer system 920 may also include other forms of storage such as cache memory in processor subsystem 925 and secondary storage on I/O Devices 927 (e.g., a hard drive, storage array, etc.). In some embodiments, these other forms of storage may also store program instructions executable by processor subsystem 925. In some embodiments, memory 921 may include various ones of the modules discussed above, such as remote verification module 104 of FIGS. 1 and/or 3 (and the various sub-modules implemented of the latter), among others.

I/O interfaces 922 may be any of various types of interfaces configured to couple to and communicate with other devices, according to various embodiments. In one embodiment, I/O interface 922 is a bridge chip (e.g., Southbridge) from a front-side to one or more back-side buses. I/O interfaces 922 may be coupled to one or more I/O devices 927 via one or more corresponding buses or other interfaces. Examples of I/O devices 927 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 920 is coupled to a network via a network interface device 927 (e.g., configured to communicate over WiFi, Bluetooth, Ethernet, etc.).

Numerous variations and modifications will become apparent to those skilled in the art once the above disclosure is fully appreciated. It is intended that the following claims be interpreted to embrace all such variations and modifications.

What is claimed is:

1. A non-transitory computer-readable storage medium storing program instructions executable by a computer system to perform operations comprising:
    causing an audio tone to be generated by a speaker of the computer system responsive to a transaction request;
    producing waveform information indicative of a detected audio tone that is detected via a microphone of the computer system responsive to the generated audio tone;
    determining, using the waveform information, verification information indicative of a time lag between the generated audio tone and the detected audio tone;
    causing the verification information to be provided to a remote verification system, wherein the verification information is usable to verify whether the computer system is a mobile device by determining whether the time lag corresponds to an expected range of speaker-microphone distances for mobile devices.

2. The computer-readable storage medium as recited in claim 1, wherein causing the audio tone to be generated comprises generating the audio tone at a specified frequency, wherein the specified frequency is greater than or equal to 15 KHz.

3. The computer-readable storage medium as recited in claim 1, wherein causing the audio tone to be generated comprises generating the audio tone at a frequency according to a random number generated by the remote verification system.

4. The computer-readable storage medium as recited in claim 1, wherein producing the waveform information includes filtering background noise from the detected audio tone.

5. The computer-readable storage medium as recited in claim 1, wherein the time lag is determined based on a phase difference between the generated audio tone and the waveform information indicative of the detected audio tone.

6. The computer-readable storage medium as recited in claim 1, wherein the operations further comprise:
    receiving a user request for a payment;
    sending the transaction request to the remote verification system responsive to the user request; and
    receiving a verification request from the remote verification system responsive to the transaction request;

wherein causing the audio tone to be generated is performed responsive to receiving the verification request, and wherein the verification information.

7. An apparatus, comprising:
a speaker;
a microphone;
a processor configured to execute program instructions stored on the apparatus to:
send a transaction request to a remote verification system;
receive a verification request from the remote verification system, wherein the verification request is responsive to the transaction request; and
perform a verification procedure that includes:
causing an audio tone to be generated by the speaker;
detecting, by the microphone, the generated audio tone as a detected audio tone;
generating verification information that is based on the generated audio tone and the detected audio tone, wherein the verification information indicates a distance between the speaker and the microphone, wherein the distance is usable by the remote verification system for comparison with an expected speaker-microphone distance to approve the transaction request; and
transmitting the verification information to the remote verification system, wherein the verification information is usable by the remote verification system to determine whether to approve the transaction request.

8. The apparatus as recited in claim 7, wherein the expected speaker-microphone distance is for a device type indicated by the transaction request.

9. The apparatus as recited in claim 7, wherein the verification information indicates a time lag between the generated audio tone and the detected audio tone, wherein the time lag is usable by the remote verification system for comparison with an expected time lag to approve the transaction request.

10. The apparatus as recited in claim 7, wherein the apparatus is a mobile device configured to implement a bandpass filter that operates on the detected audio tone to remove background noise and produce a filtered audio tone that is used to generate the verification information.

11. The apparatus as recited in claim 7, wherein generating the verification information is based on a frequency of the generated audio tone and a frequency of the detected audio tone.

12. The apparatus as recited in claim 11, wherein the frequency of the generated audio tone is an ultrasonic frequency.

13. A method comprising:
transmitting, from a computing device to a remote verification system, a transaction request that includes information indicating that the computing device is a mobile device;
receiving, at the computing device, a request for verification information from the remote verification system, the request for verification information specifying one or more desired characteristics of a tone to be generated by a speaker of the computing device, wherein the one or more desired characteristics include a specified frequency of the tone;
causing an audio tone to be generated by a speaker of the computing device;
detecting, by a microphone of the computing device, the generated audio tone as a detected audio tone; and
transmitting verification information from the computing device to the remote verification system, wherein the verification information is usable by the remote verification system to determine whether to approve the transaction request, and wherein the verification information includes information indicative of a time lag between the tone as detected and the tone as generated.

14. The method of claim 13, wherein the transaction request includes an expected distance between the speaker and the microphone, and wherein the information indicative of the lag is usable to verify the expected distance.

15. The method of claim 13, wherein the specified frequency is an ultrasonic frequency.

16. The method of claim 13, wherein the verification information includes background noise information recorded by the computing device and further includes a reported location of the computing device at a time of the transaction request, wherein the background noise information and the reported location are usable by the remote verification system to determine whether to approve the transaction request.

17. The method of claim 13, wherein the one or more desired characteristics include a modulation value to be used by the computing device to modulate a carrier signal in order to generate the tone, wherein the modulation value corresponds to a first set of information, and wherein the method further comprises generating a second set of information by demodulating the detected audio tone, wherein the first and second sets of information are usable by the remote verification system to determine whether to approve the transaction request.

18. The method of claim 13, further comprising determining the time lag based on a phase difference between the generated audio tone and the detected audio tone.

19. The method of claim 13, further comprising producing a filtered audio tone from the detected audio tone using a bandpass filter.

20. The method of claim 13, wherein the transaction request comprises a payment request issued from a payment application executing on the computing device.

* * * * *